United States Patent
Larkins

(10) Patent No.: US 11,597,591 B2
(45) Date of Patent: Mar. 7, 2023

(54) HANG HARVESTING SYSTEM

(71) Applicant: DriFlower, LLC, Ashland, OR (US)

(72) Inventor: Todd Chandler Larkins, Ashland, OR (US)

(73) Assignee: DRIFLOWER, LLC, Ashland, OR (US)

( * ) Notice: Subject to any disclaimer, the term of this patent is extended or adjusted under 35 U.S.C. 154(b) by 296 days.

(21) Appl. No.: 17/038,619

(22) Filed: Sep. 30, 2020

(65) Prior Publication Data

US 2021/0094756 A1 Apr. 1, 2021

Related U.S. Application Data

(60) Provisional application No. 62/907,766, filed on Sep. 30, 2019.

(51) Int. Cl.
*B65D 88/00* (2006.01)
*B65D 90/00* (2006.01)
*B65D 88/12* (2006.01)
*A01F 25/12* (2006.01)

(52) U.S. Cl.
CPC .......... *B65D 90/0053* (2013.01); *A01F 25/12* (2013.01); *B65D 88/127* (2013.01); *B65D 88/129* (2013.01); *B65D 2590/0066* (2013.01)

(58) Field of Classification Search
CPC ......... B60P 7/13; B60P 1/6409; B60P 1/6418; A01F 25/12; A01F 2025/147; A24B 1/02; A24B 1/08
USPC .......................... 410/129, 141–145, 150, 151
See application file for complete search history.

(56) References Cited

U.S. PATENT DOCUMENTS

| | | | |
|---|---|---|---|
| 507,797 A * | 10/1893 | Ford et al. | |
| 941,448 A | 11/1909 | Haglund | |
| 945,729 A | 1/1910 | Rangnow | |
| 1,321,997 A | 11/1919 | Duberstein | |
| 1,515,078 A | 11/1924 | Sheee | |
| 1,833,388 A | 11/1931 | Carmack | |
| 1,868,638 A | 7/1932 | Mackey | |
| 2,099,596 A | 11/1937 | Bruening | |
| 2,150,869 A | 3/1939 | Shafarman | |

(Continued)

FOREIGN PATENT DOCUMENTS

| | | |
|---|---|---|
| CA | 2458956 A1 | 9/2004 |
| CN | 105474854 A | 4/2016 |

(Continued)

OTHER PUBLICATIONS

International Search Report and Written Opinion issued in corresponding International Application No. PCT/US2020/054898 dated Jan. 22, 2021, 14 pages.

(Continued)

*Primary Examiner* — Stephen T Gordon
(74) *Attorney, Agent, or Firm* — Carter, DeLuca & Farrell LLP; George Likourezos

(57) ABSTRACT

A hang harvesting system for deployment in a cargo container includes an anchor bar, a column bar, and a hanging bar. The anchor bar includes a first end portion and second end portion configured to engage sidewalls of the cargo container. The column bar includes a top end portion and a bottom end portion, wherein the top end portion is configured to couple to the anchor bar. The hanging bar is coupled to the column bar.

18 Claims, 3 Drawing Sheets

(56) References Cited

U.S. PATENT DOCUMENTS

| | | |
|---|---|---|
| 2,279,777 A | 4/1942 | Dean |
| 2,289,729 A | 7/1942 | Robinson et al. |
| 2,411,856 A | 12/1946 | Harding |
| 2,484,449 A | 10/1949 | Fetterman |
| 2,546,929 A | 3/1951 | Nampa |
| 2,580,193 A | 12/1951 | Richterkessing |
| 2,586,913 A | 2/1952 | Burns |
| 2,634,031 A | 4/1953 | Klein |
| 2,671,938 A | 3/1954 | Roberts |
| 2,692,711 A | 10/1954 | Norris et al. |
| 2,716,513 A | 8/1955 | Braunstein |
| 2,828,897 A | 4/1958 | Gordon |
| 3,131,817 A | 5/1964 | Schenkler |
| 3,194,458 A | 7/1965 | Bennett |
| D202,954 S | 11/1965 | Hanson |
| 3,346,150 A | 10/1967 | Clopton |
| D210,333 S | 2/1968 | Apy |
| 3,535,808 A | 10/1970 | Morrish |
| 3,606,948 A | 9/1971 | Strang |
| 3,874,572 A | 4/1975 | McClenning |
| D236,572 S | 9/1975 | Ostroll |
| D264,912 S | 6/1982 | Bliss et al. |
| 4,407,478 A * | 10/1983 | Hodges .............. F16L 3/133 248/62 |
| 4,440,369 A | 4/1984 | Banks |
| 4,703,878 A | 11/1987 | Louw |
| 4,717,053 A | 1/1988 | Wang |
| 4,724,967 A | 2/1988 | Valiulis |
| 4,793,531 A | 12/1988 | Blanchard et al. |
| 4,845,602 A | 7/1989 | Lehocki |
| 4,881,342 A | 11/1989 | Ferguson |
| 5,007,562 A | 4/1991 | Brink et al. |
| 5,074,445 A | 12/1991 | Chen |
| D332,180 S | 1/1993 | Marshall et al. |
| 5,329,728 A | 7/1994 | Ray |
| 5,333,409 A | 8/1994 | Mendes |
| 5,361,949 A | 11/1994 | Petrou |
| 5,388,354 A | 2/1995 | Marshall et al. |
| D357,813 S | 5/1995 | Koresko |
| 5,427,487 A * | 6/1995 | Brosfske .............. B60P 7/15 410/121 |
| 5,520,311 A | 5/1996 | Lam |
| 5,535,927 A | 7/1996 | Garrison |
| 5,544,765 A | 8/1996 | Farbman |
| 5,581,936 A | 12/1996 | Belgiorno |
| 5,813,092 A | 9/1998 | Greenfield et al. |
| 5,826,759 A | 10/1998 | Ohsugi |
| 5,884,422 A | 3/1999 | Marshall et al. |
| 5,997,228 A * | 12/1999 | Potter .............. B60P 7/15 410/151 |
| 6,047,867 A | 4/2000 | Heiber |
| 6,132,305 A | 10/2000 | Witherell |
| 6,238,154 B1 * | 5/2001 | DaPrato .............. B60P 7/15 410/151 |
| 6,298,600 B1 | 10/2001 | Feldman |
| 6,340,238 B1 | 1/2002 | Pan |
| 6,349,863 B1 | 2/2002 | Frye |
| 6,389,744 B1 | 5/2002 | Pugh |
| 6,641,105 B1 | 11/2003 | Hamerski |
| 6,659,295 B1 | 12/2003 | De Land et al. |
| 6,811,064 B2 | 11/2004 | Salem |
| 6,817,497 B2 | 11/2004 | Grasso et al. |
| D502,756 S | 3/2005 | Birdwell et al. |
| 6,863,197 B1 | 3/2005 | Dirlam et al. |
| 7,015,815 B1 | 3/2006 | Feibelman |
| 7,178,705 B1 | 2/2007 | Sutton |
| 7,377,409 B1 | 5/2008 | Brown |
| 7,774,977 B2 | 8/2010 | Miller Shelton |
| 7,984,585 B1 | 7/2011 | Wu |
| 8,276,714 B2 | 10/2012 | Broyles |
| D711,123 S | 8/2014 | Birge |
| 9,113,736 B1 | 8/2015 | Antler |
| D772,584 S | 11/2016 | Debus |
| 9,782,031 B2 | 10/2017 | Debus |
| D806,410 S | 1/2018 | Denby et al. |
| D853,737 S | 7/2019 | Wolfe |
| D867,770 S | 11/2019 | Wright |
| 2002/0184799 A1 | 12/2002 | Chou |
| 2004/0226971 A1 | 11/2004 | Detten |
| 2005/0035159 A1 | 2/2005 | Hunt et al. |
| 2005/0139625 A1 | 6/2005 | Gouldson |
| 2005/0189383 A1 | 9/2005 | Weal et al. |
| 2006/0032130 A1 | 2/2006 | Liffers et al. |
| 2006/0226179 A1 | 10/2006 | Hsu |
| 2007/0266627 A1 | 11/2007 | Shelton |
| 2008/0236041 A1 | 10/2008 | Carpenter |
| 2008/0283558 A1 | 11/2008 | Rude et al. |
| 2011/0247185 A1 | 10/2011 | Bolden et al. |
| 2011/0284597 A1 | 11/2011 | Kaleta et al. |
| 2012/0132679 A1 | 5/2012 | Gouldson |
| 2013/0015215 A1 | 1/2013 | Coote |
| 2013/0221041 A1 | 8/2013 | Wittenstein et al. |
| 2014/0246464 A1 | 9/2014 | Zhong |
| 2014/0367425 A1 | 12/2014 | Laibe |
| 2016/0058210 A1 | 3/2016 | Strassburger et al. |
| 2016/0223137 A1 | 8/2016 | Ochipa |
| 2017/0105362 A1 | 4/2017 | Irving, Jr. |
| 2017/0238731 A1 | 8/2017 | Davies |
| 2017/0325614 A1 | 11/2017 | Baltz |
| 2018/0087293 A1 | 3/2018 | Strassburger et al. |
| 2018/0103785 A1 | 4/2018 | Goldman et al. |
| 2018/0160833 A1 | 6/2018 | Ho |
| 2018/0303263 A1 | 10/2018 | Jones et al. |
| 2018/0317685 A1 | 11/2018 | Boles |
| 2018/0325299 A1 | 11/2018 | Clark et al. |
| 2018/0356028 A1 | 12/2018 | Fang |
| 2019/0014936 A1 | 1/2019 | Beyda et al. |
| 2019/0307264 A1 | 10/2019 | Carr et al. |
| 2019/0380522 A1 | 12/2019 | Johansson |
| 2020/0085221 A1 | 3/2020 | Riedel et al. |
| 2020/0128988 A1 | 4/2020 | Moore et al. |
| 2020/0245796 A1 | 8/2020 | Gilbert |

FOREIGN PATENT DOCUMENTS

| | | |
|---|---|---|
| CN | 206611910 U | 11/2017 |
| CN | 107896731 A | 4/2018 |
| DE | 3246174 C2 | 1/1994 |
| FR | 2464638 A1 | 3/1981 |
| FR | 3062120 A1 | 7/2018 |
| JP | 2008092939 A | 4/2008 |
| JP | 4218802 B2 | 2/2009 |
| JP | 4399093 B2 | 1/2010 |
| JP | 2011010890 A | 1/2011 |
| KR | 20-2005-0002675 A | 1/2005 |
| KR | 2003821320000 Y1 | 4/2005 |
| KR | 2011 0029352 A | 3/2011 |
| KR | 101071670 B1 | 10/2011 |
| KR | 2012 0131010 A | 12/2012 |
| KR | 2017 0067056 A | 6/2017 |
| KR | 20170079314 A | 7/2017 |
| KR | 101938225 B1 | 1/2019 |
| WO | 2018150157 A1 | 8/2018 |

OTHER PUBLICATIONS

Chrystal Johnson: 11 How to dry herbs from your Garden, Happy Mothering natural living in a modern world Aug. 29, 2017 (Aug. 29, 2017), Retrieved from the Internet: URL:https://www.happy-mothering.com/diy-ha nging-herb-dryer/.

International Search Report and Written Opinion for Application No. PCT/US2020/042261 dated Nov. 2, 2020.

International Search Report and Written Opinion issued in corresponding International Application No. PCT/US2020/053426 dated Jan. 18, 2021, 14 pages.

\* cited by examiner

HANG HARVESTING SYSTEM

RELATED APPLICATION

This application claims the benefit of, and priority to, U.S. Provisional Application No. 62/907,766, filed Sep. 30, 2019, the entire contents of which are hereby incorporated herein by reference.

FIELD

The present disclosure generally relates to a hang harvesting system and more particularly, to a hang harvesting system for use in a shipping container for facilitating transportation, drying, loading, and unloading of vegetation.

BACKGROUND

Recently there has been widespread growth of the use of cannabis and hemp ranging from medicine to recreational. In this widespread growth, the drying of cannabis and hemp has become an essential part of the processing of cannabis and hemp, but the process takes a significant amount of time and effort. Typically, the drying process, requires the hemp and/or cannabis to be hung with plastic netting in cargo containers, which is not only time-consuming but requires a lot of manual labor and leaves little room for error.

The process requires the hemp and/or cannabis to be hung one branch at a time and threaded through the netting to secure the hemp and/or cannabis. Removal of the hemp and/or cannabis requires careful unthreading of the hemp and/or cannabis from the plastic netting. Other methods have been contemplated, such as clothing hangers, bailing wires, string and/or ropes, screens, chains, fencing, and combinations thereof, all of which cause damage to hemp and/or cannabis. Additionally, from harvest to drying there is multiple contact with the hemp and/or cannabis that diminish the quality of the finished dried product. Therefore, there is a need to provide a system and method of hanging and drying vegetation, such as, for example, hemp, cannabis, and other plants harvested and subsequently dried, without damaging the vegetation.

SUMMARY

In one aspect, the present disclosure provides a hang harvesting system for deployment in a cargo container including an anchor bar, a column bar, and a hanging bar. The anchor bar includes a first end portion and second end portion configured to engage the sidewalls of the cargo container. The column bar includes a top end portion and a bottom end portion. The top end portion is configured to couple to the anchor bar. The hanging bar operably coupled to the column bar.

In aspects, the first end portion and the second end portion each may include an S-shaped fastener having a first end and a second end, wherein the first end of the S-shaped fastener may be configured to engage the first end portion and the second end portion of the anchor bar, and the second end of the S-shaped fastener may be configured to engage the sidewalls of the cargo container.

In aspects, the anchor bar may include at least one slot disposed between the first end portion and the second end portion.

In aspects, the top end portion of the column bar may include a hanging portion having an aperture, wherein the hanging portion is dimensioned to engage the anchor bar.

In aspects, the aperture of the hanging portion may be configured to align with the at least one slot of the anchor bar.

In aspects, a fastener may be inserted through the aperture of the hanging portion and the at least one slot of the anchor bar to inhibit movement of the column bar along the anchor bar.

In aspects, the column bar may include at least one hook disposed between the top end portion and the bottom end portion of the column bar.

In aspects, the at least one hook of the column bar may be configured to receive the hanging bar.

In aspects, the anchor bar may be configured to telescopically adjust to accommodate the width of the cargo container.

In aspects, the hanging bar may be configured to telescopically adjust to accommodate the length of the cargo container.

In aspects, the length of the column bar may be less than the height of the cargo container.

In aspects, the at least one of the anchor bar, the column bar, or the hanging bar may be formed from powder-coated aluminum material.

In another aspect, the present disclosure provides a method of deploying a hang harvesting system in a cargo container, the method including deploying at least one anchor bar along the length of the cargo container; coupling at least one column bar to the at least one anchor bar; and mounting a hanging bar on the at least one column bar.

In aspects, deploying at least one anchor bar along the length of the cargo container may include coupling the at least one anchor bar to sidewalls of the cargo container via a fastener disposed on a first end portion and a second end portion of the at least one anchor bar.

In aspects, coupling at least one column bar to the at least one anchor bar may include hooking the at least one column bar onto the at least one anchor bar via a hook of the at least one column bar.

In aspects, coupling at least one column bar to the at least one anchor bar further may include positioning the at least one column bar along the at least anchor bar by aligning a slot of the at least one anchor bar with an aperture disposed on the hook of the at least one column bar.

In aspects, mounting a hanging bar on the at least one column bar may include hanging a hanging bar on a hook of the at least one column bar.

In aspects, the at least one anchor bar may be telescopically adjustable to accommodate the width of the cargo container and the hanging bar may be telescopically adjustable to accommodate the length of the cargo container.

In aspects, the at least one anchor bar, the at least one column bar, and the hanging bar may be formed from powder-coated aluminum material.

In aspects, the method may further include hanging at least one vegetation hanger on the hanging bar; and receiving vegetation from a point of harvest onto the vegetation hanger.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Particular embodiments of the disclosure are described hereinbelow with reference to the accompanying drawings. In the following description, well-known functions or constructions are not described in detail to avoid obscuring the present disclosure in unnecessary detail.

The following aspects of a harvesting system, and in particular, a hang harvesting system configured for deployment in a shipping container, e.g., cargo container to facilitate transportation, drying, loading, and unloading of vegetation, e.g., cannabis and hemp.

The hang harvesting system deployed in shipping containers of the disclosure detailed below may be incorporated into different types of containers, dry spaces, or other enclosures. The particular illustrations and embodiments disclosed herein are merely exemplary and do not limit the scope or applicability of the disclosed technology.

Figure 1:
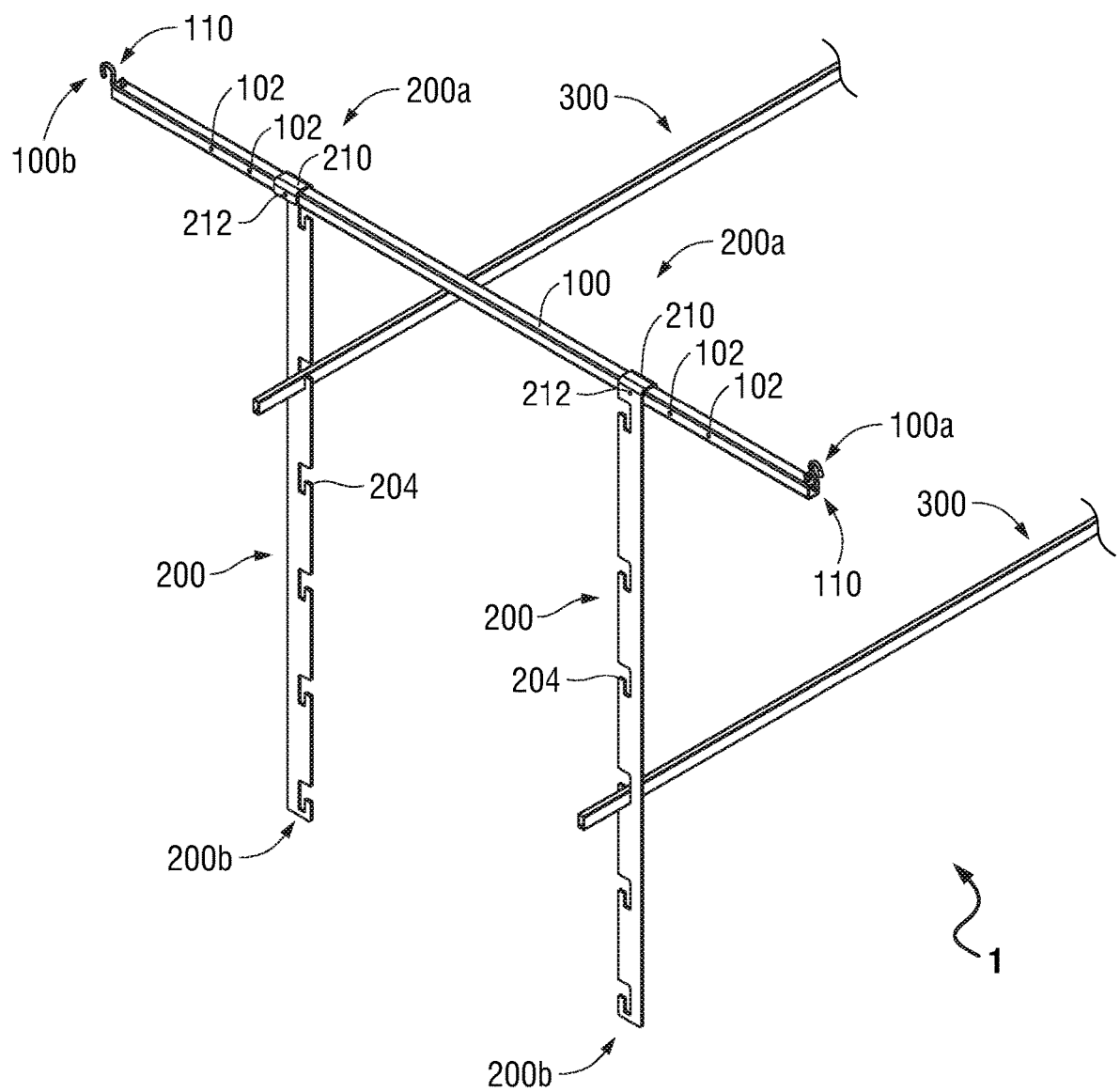
FIG. 1 is a perspective view of a hang harvesting system in accordance with the present disclosure.
Figure 2A:
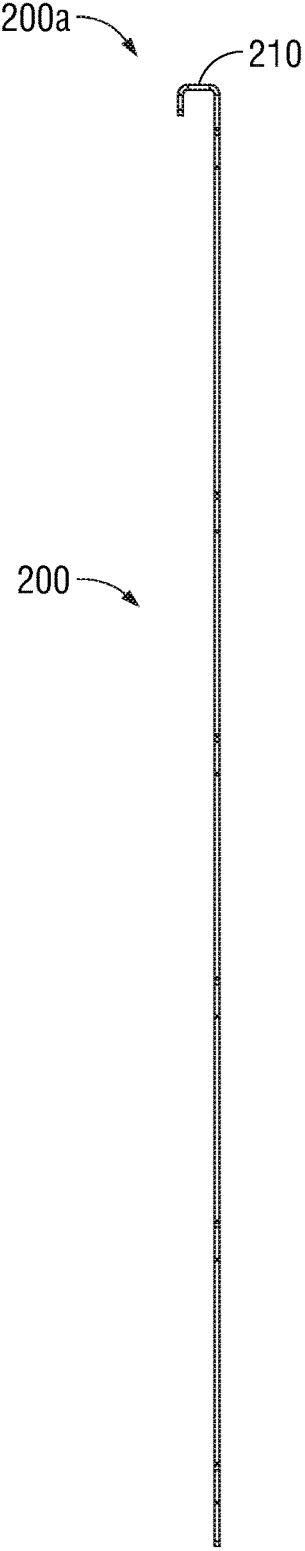
FIG. 2A is a front view of a column bar of the hang harvesting system of FIG. 1.
Figure 2B:
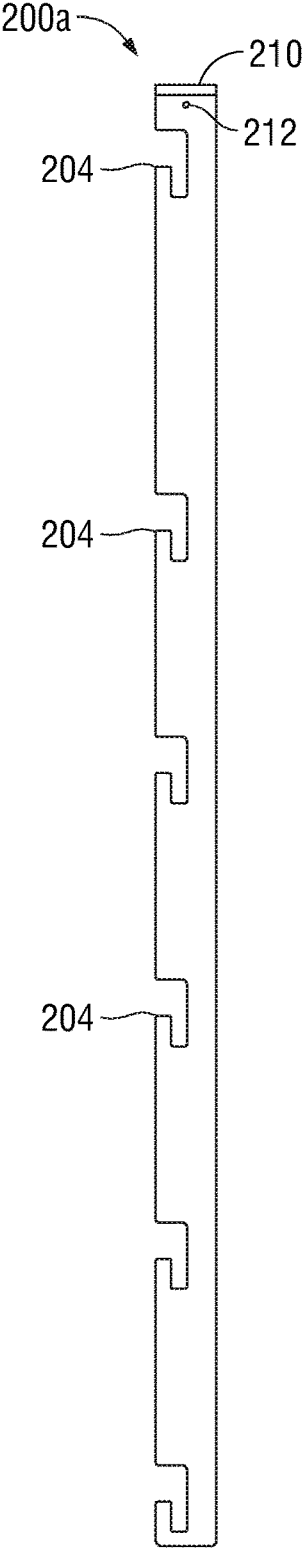
FIG. 2B is a side view of the column bar of the hang harvesting system of FIG. 1.
Figure 3:
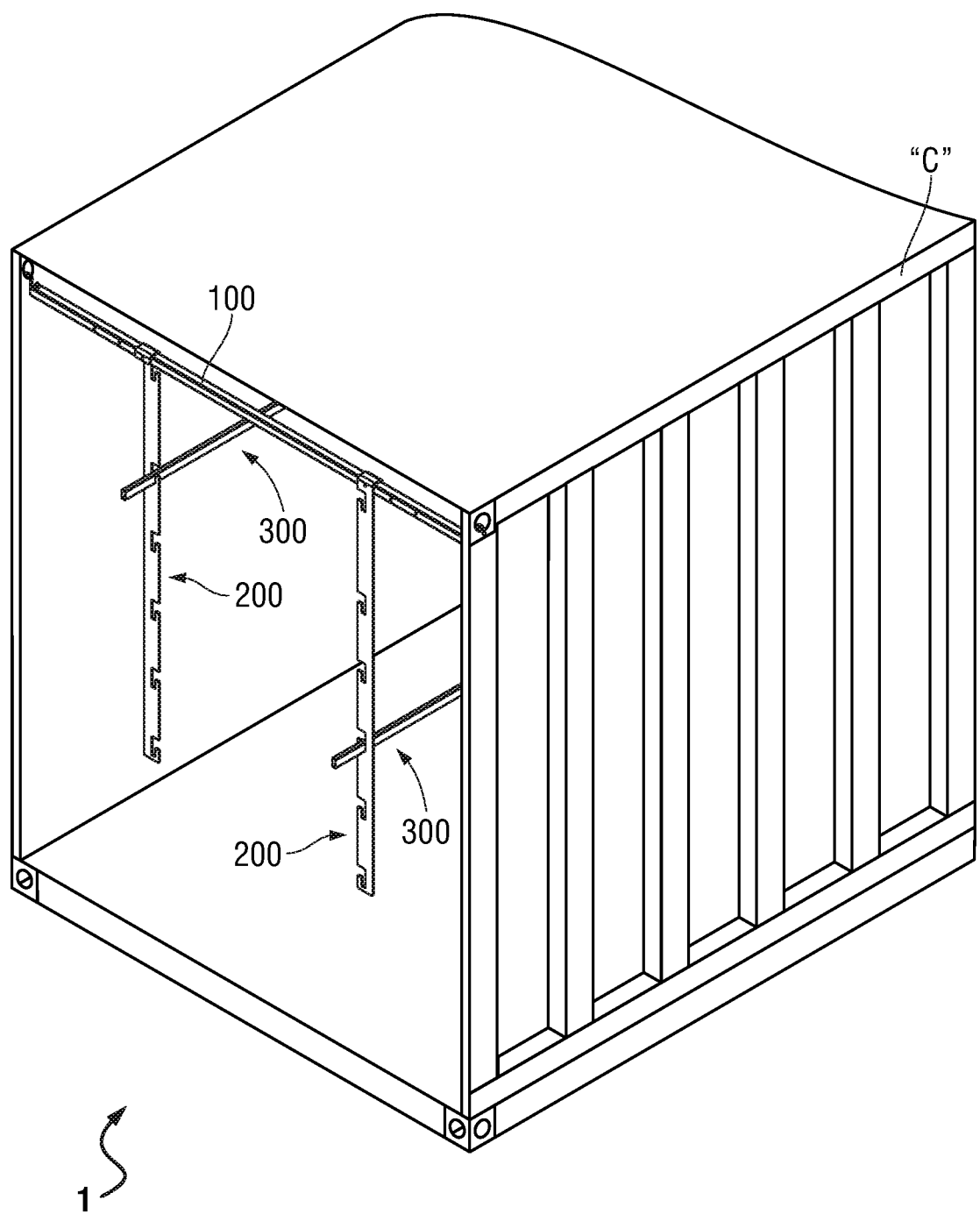
FIG. 3 is a perspective view of the hang harvesting system of FIG. 1 deployed in a cargo container.

Referring initially to FIGS. 1 and 3, which illustrates the hang harvesting system 1 configured to be sufficiently portable for the pre-harvest hanging of vegetation near the field, hydroponic site, and/or greenhouse. The hang harvesting system 1 generally includes an anchor bar 100, a column bar 200, and a hanging bar 300.

The anchor bar 100 is configured to provide a foundation for the hang harvesting system 1 within the cargo container "C" and generally includes a first end portion 100a and a second end portion 100b. The first end portion 100a and the second end portion 100b includes a fastener 110 configured to couple to opposing sidewalls of the cargo container "C" having U-shaped members, anchors, or other complementary fasteners. The fastener 110 of the first end portion 100a and the second end portion 100b defines an S-shaped fastener having a first end and a second end. The first end of the S-shaped fastener is configured to engage the first end portion 100a and the second end portion 100b of the anchor bar. The second end of the S-shaped fastener is configured to engage the sidewalls of the cargo container "C". The fastener 110 may be any suitable fastener configured to couple to the sidewalls of the cargo container "C" and provide support for the hang harvesting system, such as, for example, wall anchors, hanging cleats, or mounting brackets. The anchor bar 100 further includes slots 102 extending through the anchor bar 100 and disposed along the anchor bar 100. The anchor bar 100 may define a square tube having a length of 7.5 feet to accommodate the width of standard cargo containers, e.g., 8 feet. The anchor bar 100 may be telescopically adjustable to accommodate different widths of cargo containers. The hang harvesting system 1 may include multiple anchor bars 100 disposed along the length of the cargo container "C" to provide complimentary support of the hanging bar 300. The anchor bar 100 may be manufactured from powder-coated aluminum material.

Referring to FIGS. 1, 2A, 2B, and 3, the column bar 200 having a top end portion 200a and a bottom end portion 200b. The top end portion 200a includes a hanger portion 210 configured to engage the column bar 200 to the anchor bar 100. The hanger portion 210 further includes an aperture 212 configured to align with slots 102 of the anchor bar 100. The column bar 200 is configured to be adjusted along the anchor bar 100 to provide flexibility in the positioning of the hanging bar 300 within the hang harvesting system 1. The column bar 200 may be coupled to the anchor bar 100 via a push pin (not shown) inserted through the aperture 212 and slots 102 to prevent further movement of the column bar 200 along the anchor bar 100. The push pin may have a spring or friction fit mechanism to create a tight coupling between the anchor bar 100 and the column bar 200. The column bar 200 further includes at least one hook 204 disposed between the top end portion 200a and the bottom end portion 200b and configured to receive the hanging bar 300. The column bar 200 is configured to have a predetermined length to provide some clearance between the bottom end portion 200b of the column bar 200 and the floor of the cargo container "C". The column bar 200 may have a length of 7.5-8.5 feet to accommodate the height of standard cargo containers e.g., 8.5-9.5 feet. Each anchor bar 100 of the hang harvesting system 1 may include a pair of column bars 200 coupled to the anchor bar 100 in a spaced-apart relationship to provide spacings between one another to facilitate the hanging of multiple hanging bars 300 in parallel. The column bar 200 may be manufactured from powder-coated aluminum material.

The hanging bar 300 is configured to engage the hanger portion 210 of the column bar 200 and facilitate the hanging of vegetation hangers (not shown). The vegetation hangers are configured to slide along the hanging bar 300. To provide proper support of the hanging bar 300, as briefly disclosed above, at least two anchor bars 100 are coupled to the sidewalls of the cargo container "C" along the length of the cargo container "C". Each of the at least two anchor bars 100 include column bars 200 disposed in alignment with each other along the length of the cargo container "C". The hanger portion 210 of the column bars 200 in alignment with each other receives the hanging bar 300. The hanging bar 300 may be configured to traverse the length of the cargo container "C". The hanging bar 300 may have a length of 9.5-39.5 feet to accommodate the length of standard cargo containers, e.g., 10 feet, 20 feet, or 40 feet. The hanging bar 300 may be telescopically adjustable to accommodate different lengths of cargo containers. The hanging bar 300 may be manufactured from powder-coated aluminum material.

In operation, the hang harvesting system 1 is deployed in a cargo container "C" at the point of harvest. Multiple anchor bars 100 are coupled along the length of the cargo container "C" to the sidewalls of the cargo container "C". In some instances, the anchor bars 100 are telescopically adjusted to fit the width of the cargo container "C". Multiple column bars 200 are positioned along each of the multiple anchor bars 100 to align the aperture 212 of the column bars 200 with slots 102 of the anchor bars 100. Once aligned, the column bars 200 are coupled to the anchor bars 100 via a push pin. After the coupling of the column bars 200 to the anchor bar 100, the hanging bar 300 is mounted on the hook 204 of column bars 200 hung on different anchor bars 100 in parallel. In some instances, the hanging bar 300 is telescopically adjusted to fit the length of the cargo container "C". In some instances, the hanging bar 300 is telescopically adjusted to accommodate the distance between the column bars 200 hung in parallel on different anchor bars 100. Once the hanging bars 300 are mounted on the hook 204 of the column bars 200, vegetation hangers are hung on the hanging bar and ready to receive vegetation at the point of harvest.

Persons skilled in the art will understand that the systems and methods specifically described herein and illustrated in the accompanying drawings are non-limiting exemplary embodiments. It is envisioned that the elements and features illustrated or described in connection with one exemplary embodiment may be combined with the elements and features of another without departing from the scope of the disclosure. As well, one skilled in the art will appreciate further features and advantages of the disclosure based on the above-described embodiments. Accordingly, the disclosure is not to be limited by what has been particularly shown and described, except as indicated by the appended claims.

What is claimed:

1. A hang harvesting system for deployment in a cargo container comprising:
    an anchor bar having a first end portion and second end portion configured to engage sidewalls of the cargo container;
    a column bar having a top end portion and a bottom end portion, wherein the top end portion is configured to couple to the anchor bar; and
    a plurality of hanging bars, wherein the column bar has a plurality of hooks each defining a slot configured for receipt of a respective one of the plurality of hanging bars, wherein the plurality of hooks are spaced from one another along a length of the column bar.

2. The hang harvesting system according to claim 1, further comprising:
    a first S-shaped fastener having a first end configured to engage the first end portion of the anchor bar, and a second end configured to engage a first sidewall of the cargo container; and
    a second S-shaped fastener having a first end configured to engage the second end portion of the anchor bar, and a second end configured to engage a second sidewall of the cargo container.

3. The hang harvesting system according to claim 1, wherein the anchor bar includes at least one slot disposed between the first end portion and the second end portion.

4. The hang harvesting system according to claim 3, wherein the top end portion of the column bar includes a hanging portion having an aperture, wherein the hanging portion is dimensioned to engage the anchor bar.

5. The hang harvesting system according to claim 4, wherein the aperture of the hanging portion is configured to align with the at least one slot of the anchor bar.

6. The hang harvesting system according to claim 5, further comprising a fastener configured to be inserted through the aperture of the hanging portion and the at least one slot of the anchor bar to inhibit movement of the column bar along the anchor bar.

7. The hang harvesting system according to claim 1, wherein the anchor bar is configured to telescopically adjust to accommodate a width of the cargo container.

8. The hang harvesting system according to claim 1, wherein at least one hanging bar of the plurality of hanging bars is configured to telescopically adjust to accommodate a length of the cargo container.

9. The hang harvesting system according to claim 1, wherein the length of the column bar is less than a height of the cargo container.

10. The hang harvesting system according to claim 1, wherein at least one of the anchor bar, the column bar, or the plurality of hanging bars is formed from powder-coated aluminum material.

11. A method of deploying a hang harvesting system in a cargo container, the method comprising:
    deploying at least one anchor bar along a length or width of the cargo container;
    coupling at least one column bar to the at least one anchor bar;
    mounting a hanging bar on the at least one column bar;
    hanging at least one vegetation hanger on the hanging bar; and
    receiving vegetation from a point of harvest onto the at least one vegetation hanger.

12. The method according to claim 11, wherein deploying at least one anchor bar along the length or width of the cargo container includes coupling the at least one anchor bar to opposing sidewalls of the cargo container via a first fastener coupled to a first end portion of the at least one anchor bar and a second fastener coupled to a second end portion of the at least one anchor bar.

13. The method according to claim 11, wherein coupling at least one column bar to the at least one anchor bar includes hanging the at least one column bar onto the at least one anchor bar via a hanging portion of the at least one column bar.

14. The method according to claim 13, wherein coupling at least one column bar to the at least one anchor bar further includes positioning the at least one column bar along the at least anchor bar by aligning a slot of the at least one anchor bar with an aperture disposed on the hanging portion of the at least one column bar.

15. The method according to claim 11, wherein mounting the hanging bar on the at least one column bar includes hanging the hanging bar on a hook of the at least one column bar.

16. The method according to claim 11, wherein the at least one anchor bar is telescopically adjustable to accommodate the width of the cargo container and the hanging bar is telescopically adjustable to accommodate the length of the cargo container.

17. The method according to claim 11, wherein the at least one anchor bar, the at least one column bar, or the hanging bar is formed from powder-coated aluminum material.

18. The hang harvesting system according to claim 1, further comprising a vegetation hanger configured to hang from one hanging bar of the plurality of hanging bars and to receive vegetation.

\* \* \* \* \*